US007254340B2

United States Patent
Jung et al.

(10) Patent No.: US 7,254,340 B2
(45) Date of Patent: Aug. 7, 2007

(54) APPARATUS AND METHOD FOR TRACKING OPTICAL WAVELENGTH IN WDM PASSIVE OPTICAL NETWORK USING LOOP-BACK LIGHT SOURCE

(75) Inventors: Dae-Kwang Jung, Suwon-si (KR); Yun-Je Oh, Yongin-si (KR); Seong-Taek Hwang, Pyeongtaek-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 707 days.

(21) Appl. No.: 10/780,132

(22) Filed: Feb. 17, 2004

(65) Prior Publication Data

US 2005/0047784 A1    Mar. 3, 2005

(30) Foreign Application Priority Data

Aug. 27, 2003  (KR)  ............... 10-2003-0059536

(51) Int. Cl.
*H04J 14/02* (2006.01)
*H04B 10/00* (2006.01)

(52) U.S. Cl. ........................ 398/95; 398/169
(58) Field of Classification Search ............ 398/95, 398/165–171

See application file for complete search history.

(56) References Cited

U.S. PATENT DOCUMENTS

| 5,729,369 | A | 3/1998 | Zirngibl | 359/110 |
| 6,043,915 | A | 3/2000 | Giles et al. | 359/132 |
| 6,304,350 | B1 | 10/2001 | Doerr et al. | 359/130 |
| 6,925,266 | B1* | 8/2005 | Muller | 398/196 |
| 6,980,742 | B1* | 12/2005 | Liden et al. | 398/85 |
| 2004/0091265 | A1* | 5/2004 | Kim et al. | 398/72 |

OTHER PUBLICATIONS

European search report for Application EP 04 01 1315, dated Mar. 21, 2006 (provided by Applicant filed Apr. 13, 2006).*

* cited by examiner

*Primary Examiner*—Shi K. Li
(74) *Attorney, Agent, or Firm*—Cha & Reiter, L.L.C.

(57) ABSTRACT

An optical wavelength tracking apparatus and method in a wavelength division multiplexed (WDM) passive optical network (PON) in which a central office (CO) having a multi-frequency light source is connected to a plurality of optical network units (ONUs) having loop-back light sources through a WDM MUX/DEMUX in a remote node (RN). The power levels of downstream and upstream WDM optical signals are measured. The WDM wavelengths of the multi-frequency light source and the WDM MUX/DEMUX are controlled to be nearly identical in order to minimize the difference between the power levels of the downstream and upstream WDM optical signals.

16 Claims, 4 Drawing Sheets

APPARATUS AND METHOD FOR TRACKING OPTICAL WAVELENGTH IN WDM PASSIVE OPTICAL NETWORK USING LOOP-BACK LIGHT SOURCE

CLAIM OF PRIORITY

This application claims priority under 35 U.S.C. § 119 to an application entitled "Apparatus and Method for Tracking Optical Wavelength in Wavelength Division Multiplexed Passive Optical Network Using Loop-back Light Source," filed in the Korean Intellectual Property Office on Aug. 27, 2003 and assigned Serial No. 2003-59536, the contents of which are incorporated herein by reference.

BACKGROUND OF THE INVENTION

1. Field of the Invention

The present invention relates generally to a WDM (Wavelength Division Multiplexed) PON (Passive Optical Network) using loop-back light sources. More particularly, the present invention relates to an optical wavelength tracking apparatus and method for rendering the WDM wavelengths of a multi-frequency light source in a central office (CO) identical to those of a WDM multiplexer/demultiplexer (MUX/DEMUX) in a remote node (RN).

2. Description of the Related Art

A WDM PON provides very high-speed, wide-band communication service to subscribers by optical signals having different subscriber-specific wavelengths. Thus, the WDM PON helps to ensure the privacy of communications, and easily satisfies individual users' demands for additional communication services or a larger communication capacity. This service accommodates more and more subscribers simply by adding specific wavelengths for new subscribers. Despite these advantages, the WDM PON has serious drawbacks that have delayed deployment because of the requirement of an additional wavelength stabilizing circuit for stabilizing the oscillation frequency of a light source that generates an optical signal in both a CO and each subscriber device. Therefore, the development of an economical WDM light source is essential to implementation of the WDM PON. Loop-back light sources, such as a Fabry-Perot laser injection-locked to the wavelength of an external optical signal or a reflective semiconductor optical amplifier (RSOA), have been proposed as economical WDM light sources for upstream data transmission from an optical network unit (ONU) as a subscriber device to a CO. A loop-back light source used for upstream data transmission in the ONU receives an optical signal from the CO and outputs an optical signal having the same wavelength as that of the received optical signal that is modulated according to the upstream transmission data. Hence, the loop-back light source does not need frequency selection and wavelength stabilization. In addition, the Fabry-Perot laser is a low-price light source that is popular because the laser outputs an optical signal injection-locked to an input optical signal and the injection-locked signal is a high-power signal with a narrow linewidth. Therefore, the Fabry-Perot laser can transmit modulated data at high speed. The RSOA amplifies an input optical signal to a high power level even though it is at a very low power level, and modulates the amplified signal according to an upstream transmission data signal. Hence, if the ROSA is used as a Loop-back light source in the ONU, a low price multi-frequency light source, which generates a WDM optical signal destined for loop-back light source in the ONU, is usable in the CO.

In general, the physical configuration of the PON is that of a double star topology, thereby minimizing the length of the optical lines used. In other words, the CO is connected to an RN close-by to subscribers by a single optical fiber, and the RN is in turn connected to the individual subscribers by independent optical fibers. Therefore, the CO and the RN are provided with a WDM MUX for WDM-multiplexing optical signals having different wavelengths and a WDM DEMUX for WDM-demultiplexing the WDM optical signal. Arrayed waveguide gratings (AWGs) are usually used as the WDM MUX/DEMUX. The RN close-by to the subscribers does not require a device to maintain an internal temperature constant. As a result, the RN is affected by temperature changes between seasons, or between day and night. The WDM wavelengths of the AWG WDM MUX/DEMUX in the RN are subsequently changed by the temperature variations. The wavelength variation of the AWG with temperature is determined according to the material of the AWG. If the AWG is formed of an III-IV group compound, a typical semiconductor material, its wavelength variation with temperature is about 0.1 nm/° C. If the AWG is formed of silica ($SiO_2$), the wavelength variation with temperature is about 0.01 nm/° C.

As the WDM wavelengths of the WDM MUX/DEMUX in the RN change with corresponding temperature changes, the WDM wavelengths of the multi-frequency light source in the CO are not exactly the same as compared with those of the WDM MUX/DEMUX in the RN. Similarly, the WDM wavelengths of the WDM DEMUX in the CO are at variance from those of the WDM MUX/DEMUX in the RN. The resulting increase in the output loss of upstream and downstream channels and crosstalk from adjacent channels degrades system transmission performance. Accordingly, there is a need for developing optical wavelength tracking techniques for making the WDM wavelengths of the multi-frequency light source and the WDM DEMUX identical to those of the WDM MUX/DEMUX in the RN in order to prevent the transmission performance degradation caused by the temperature change in the RN.

In light of the above, there have been proposed some optical wavelength tracking schemes to render the wavelengths of the WDM light source for downstream transmission to be identical to those of the AWG varying with temperature in the RN in the WDM PON. One of them is U.S. Pat. No. 5,729,369 entitled "Method of Tracking a Plurality of Discrete Wavelengths of a Multi-Frequency Optical Signal for Use in a Passive Optical Network Telecommunications System", invented by Martin Zirngibl, and granted on Mar. 17, 1998. According to the patent, the discrete wavelengths are tracked by removing one of ONUs connected to a multi-frequency router corresponding to the WDM MUX/DEMUX in the RN and reflecting back a wavelength corresponding to the removed ONU in the upstream direction.

Another optical wavelength tracking scheme attempting to solve the aforementioned problems is found in U.S. Pat. No. 6,304,350 entitled "Temperature Compensated Multi-Channel Wavelength-Division-Multiplexed Passive Optical Network", invented by Christopher Richard Doerr, et. al., and granted on Oct. 16, 2001. In this disclosure, the RN detects the power level of one of channels at a WGR (Waveguide Grating Router) corresponding to the WDM MUX/DEMUX and notifies the CO of the detected power level. The CO then changes the temperature of a multi-frequency laser (MFL) (which is a multi-frequency light source) in accordance with the change of the received power level, to thereby enable the frequencies of the MFL in the CO to track the channels of the WGR in the RN.

The above optical wavelength tracking techniques are inefficient because one of WDM wavelengths is only used for tracking, and these techniques require an additional device by which the RN measures the power level of one channel and transmits the power level to the CO, thereby increasing cost.

SUMMARY OF THE INVENTION

An object of the present invention is to provide an efficient, economical optical wavelength tracking apparatus and method in a WDM PON using loop-back light sources.

The present invention provides an optical wavelength tracking apparatus in a WDM PON in which a CO having a multi-frequency light source is connected to a plurality of ONUs having loop-back light sources through a WDM MUX/DEMUX in an RN.

In the optical wavelength tracking apparatus according to the present invention, a first optical power measurer measures the power level of a downstream WDM optical signal for the ONUs directed from the multi-frequency light source to the WDM MUX/DEMUX, a second optical power measurer measures the power level of an upstream WDM optical signal received from the loop-back light sources through the WDM MUX/DEMUX, and a control unit controls the WDM wavelengths of the multi-frequency light source and the WDM MUX/DEMUX to be nearly identical in order to minimize the difference of the power levels of the measured downstream and upstream WDM optical signals.

In the optical wavelength tracking method according to the present invention, a section of a downstream WDM optical signal for the ONUs directed from the multi-frequency light source to the WDM MUX/DEMUX is branched off, the power level of the branched optical signal is measured as a reference voltage, a section of an upstream WDM optical signal received from the loop-back light sources through the WDM MUX/DEMUX is branched off, and the power level of the branched optical signal is measured as a monitoring voltage. The WDM wavelengths of the multi-frequency light source and the WDM MUX/DEMUX are controlled to be nearly identical by adjusting the temperature of the multi-frequency light source in order to minimize the difference between the reference voltage and the monitoring voltage.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Figure 1:
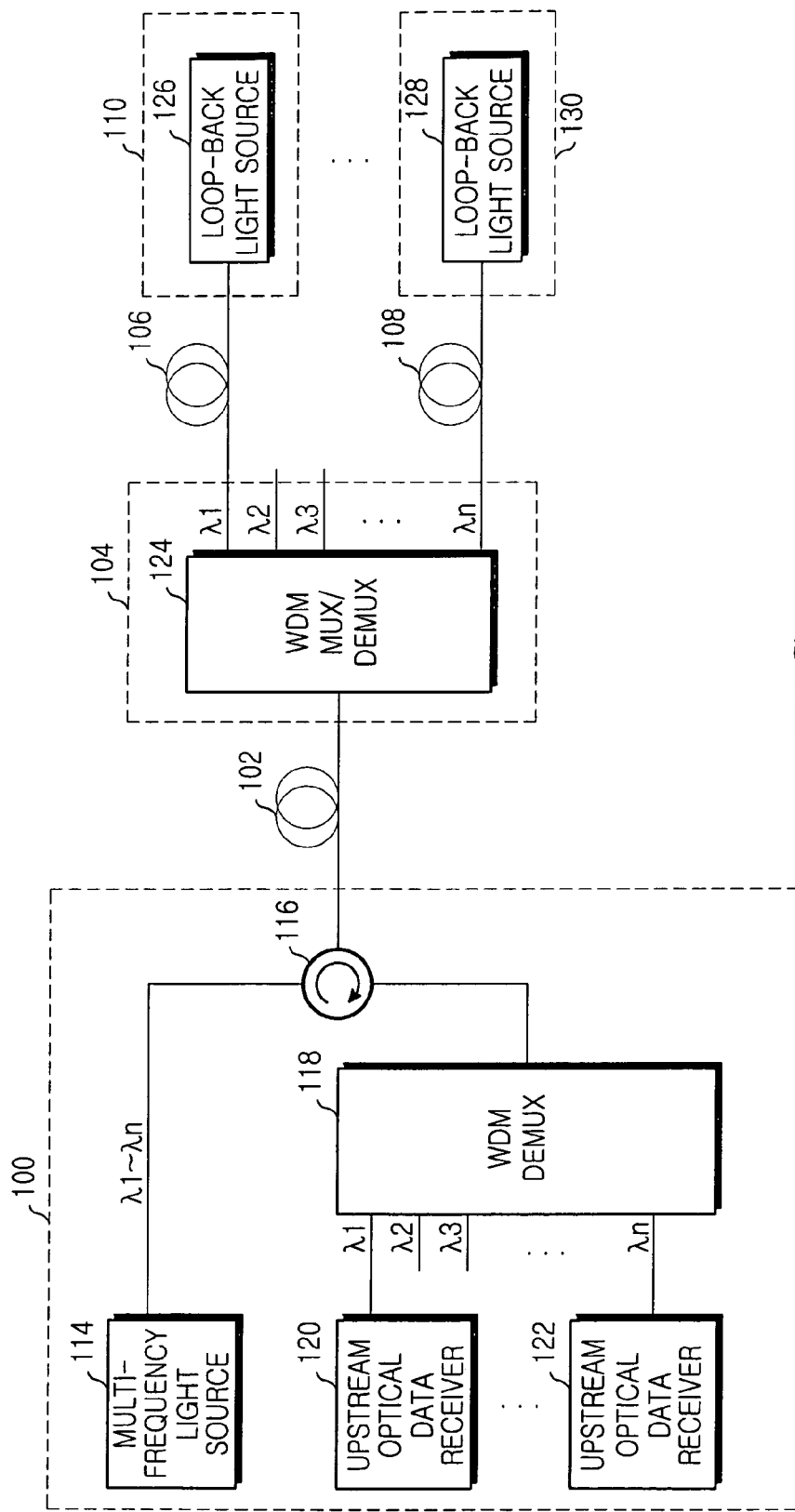
FIG. 1 illustrates the configuration of a WDM PON using loop-back light sources.

The present invention will be described herein below with reference to the accompanying drawings, which are provided for purposes of illustration and do not limit the present invention to the depiction in the drawings. In the following description, well-known functions or constructions that are known by a person of ordinary skill in the art may not be described in detail if their discussion would obscure the invention with unnecessary detail. Throughout the application it is repeated that the WDM wavelengths of the multi-frequency light source and the WDM MUX/DEMUX are controlled to be nearly identical. The term "nearly identical" for purposes of this application includes wavelengths that are completely identical in size as well as slight variations that would not impact the accuracy of the tracking apparatus.

FIG. 1 illustrates the configuration of a WDM PON using loop-back light sources. Referring to FIG. 1, a CO 100 is connected to an RN 104 adjacent to subscribers by a single optical fiber 102, and the RN 104 is connected to ONUs 110, 130 by independent optical fibers 106 to 108 An upstream data transmission structure in which the ONUs 110 to 130 transmit data to the CO 100 via a WDM MUX/DEMUX 124 in the RN 104. There are n ONUs 110 to 130 and thus a multi-frequency light source 114 generates a WDM optical signal containing optical signals at n wavelengths $\lambda 1$ to $\lambda n$. It is to be noted here that only components needed for understanding the subject matter of the present invention are shown between the CO 100 and the RN 104 and the RN 104 and the ONUs 110 to 130, with the other components omitted.

The CO 100 is comprised of the multi-frequency light source 114, an optical circulator 116, a WDM DEMUX 118, and upstream optical data receivers 120 to 122. The multi-frequency light source 114 generates a WDM optical signal destined for loop-back light sources 126 to 128 used for upstream data transmission in the ONUs 110 to 130. The optical circulator 116 connects the multi-frequency light source 114 and the WDN DEMUX 118. The circulator 116 is also connected to the optical fiber 102 which connects the CO to the WDM MUX/DEMUX 124 of the RN 104, for outputting the WDM optical signal received from the multi-frequency light source 114 to the optical fiber 102 and outputting a WDM optical signal received from the optical fiber 102 to the WDM DEMUX 118. The WDM DEMUX 118 is a 1×N WDM DEMUX that WDM-demultiplexes the WDM optical signal received from the optical circulator 116 into optical signals having the n wavelengths $\lambda 1$ to $\lambda n$ and feeds the optical signals to the upstream optical data receivers 120 to 122. The WDM DEMUX 118 is usually an AWG. The upstream optical data receivers 120 to 122 generate electrical signals corresponding to the respective received optical signals.

The RN 104 includes the 1×N WDM MUX/DEMUX 124. The WDM MUX/DEMUX 124 WDM-demultiplexes the WDM optical signal from the multi-frequency light source 114 into optical signals having the n wavelengths $\lambda 1$ to $\lambda n$ and feeding the optical signals to the optical fibers 106 to 108. It also WDM-multiplexes optical signals having the n wavelengths $\lambda 1$ to $\lambda n$ received from the optical fibers 106 to 108 and feeds the multiplexed optical signal to the optical fiber 102. The ONUs 110 to 122 have their respective loop-back light sources 126 to 128 that generate optical signals at specific wavelengths for upstream data transmission. As described before, injection-locked Fabry-Perot lasers or RSOAs are used as the loop-back light sources 126 to 128.

The WDM optical signal output from the multi-frequency light source 114 in the CO 100 reaches the RN 104 via the optical circulator 116 and the optical fiber 102. The WDM optical signal is then WDM-demultiplexed in the WDM MUX/DEMUX 124 in the RN 104. The respective demultiplexed optical signals are applied to the input of the upstream light sources, the loop-back light sources 126 to 128 in the ONUs 110 to 130 via the optical fibers 106 to 108. The loop-back light sources 126 to 128 output optical signals having the same wavelengths as those of the received optical signals and modulated according to upstream data signals. The signals from the loop-back light sources 126 to 128 are WDM-multiplexed in the WDM MUX/DEMUX 124 of the RN 104 and then transmitted to the CO 100. The WDM optical signal is applied to the input of the WDM DEMUX 118 via the optical circulator 116. The optical signal is WDM-demultiplexed in the WDM DEMUX 118 and the demultiplexed optical signals are fed to the respective upstream optical data receivers 120 to 122.

Figure 2:
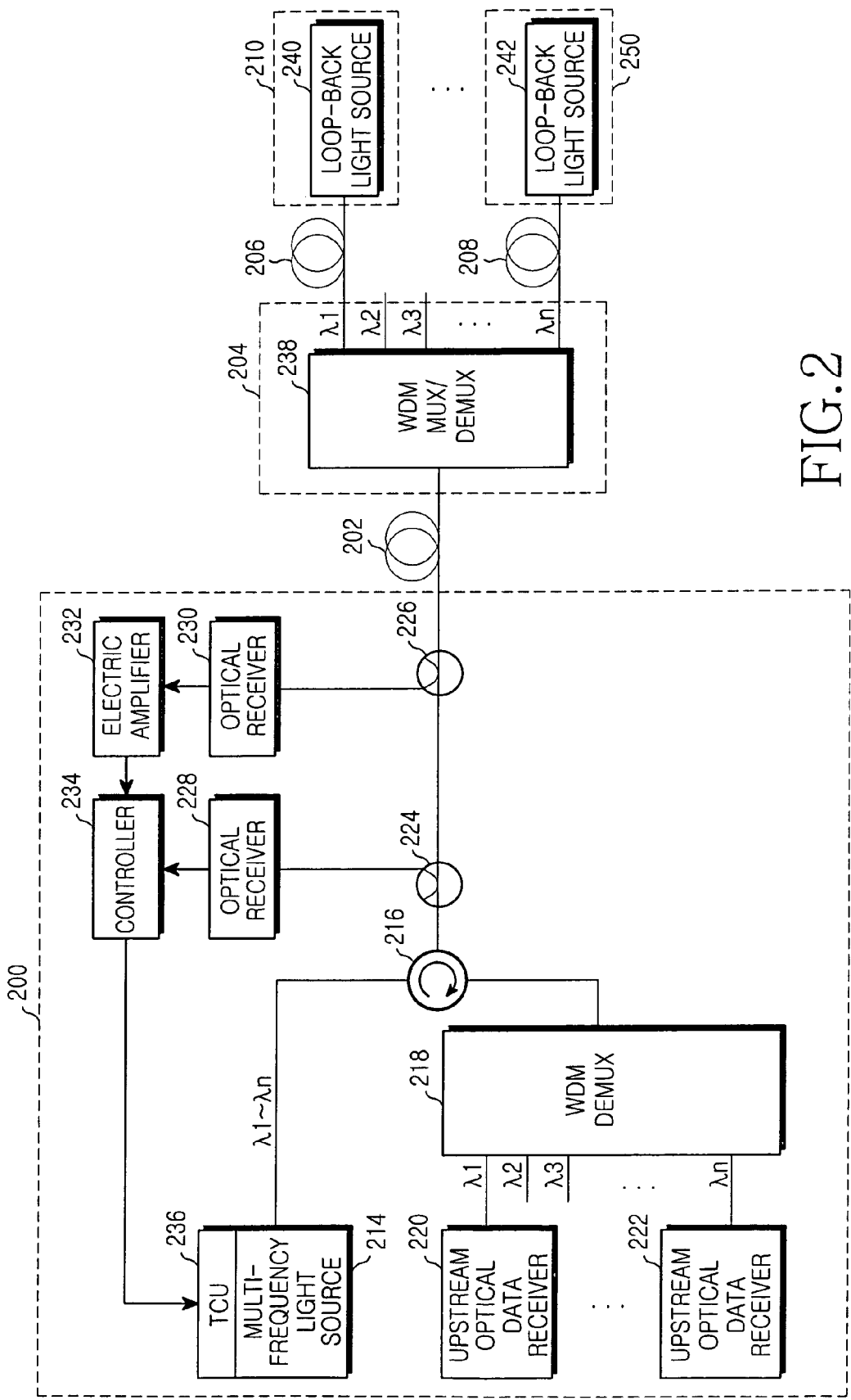
FIG. 2 illustrates the configuration of a WDM PON using loop-back light sources, including an optical wavelength tracking apparatus according to one aspect of the present invention.

FIG. 2 illustrates the configuration of a WDM PON using loop-back light sources according to a first aspect of the present invention. The WDM PON further includes an optical wavelength tracking apparatus in a CO 200 in addition to the components of the WDM PON illustrated in FIG. 1. The optical wavelength tracking apparatus including a first optical power measurer with an optical divider 224 and an optical receiver 228, a second optical power measurer with an optical divider 226, an optical receiver 230, and an electric amplifier 232, and a control unit including a controller 234 and a temperature control unit (TCU) 236.

The CO 200 is connected to an RN 204 adjacent to subscribers by a single optical fiber 202, and the RN 204 is connected to ONUs 210 to 250 by independent optical fibers 206 to 208. An upstream data transmission structure in which the ONUs 210 to 250 transmit data to the CO 200 via a WDM MUX/DEMUX 238 in the RN 204 is illustrated in FIG. 2. There are n ONUs 210 to 250 and thus a multi-frequency light source 214 generates a WDM optical signal containing optical signals at n wavelengths λ1 to λn. It is to be noted here that only components needed for understanding the subject matter of the present invention are shown between the CO 200 and the RN 204 and the RN 204 and the ONUs 210 to 250, with the other components omitted.

The optical dividers 224 and 226 are disposed in the optical signal path between the optical fiber 202 connected to the WDM MUX/DEMUX 238 of the RN 204 and an optical circulator 216. A WDM optical signal output from the multi-frequency light source 214 reaches the RN 204 via the optical circulator 216, the optical dividers 224 and 226, and the optical fiber 202. The WDM optical signal is then WDM-demultiplexed in the WDM MUX/DEMUX 238 in the RN 204. The respective demultiplexed optical signals are applied to the input of loop-back light sources 240 to 242 in the ONUs 210 to 250 via the optical fibers 206 to 208. The loop-back light sources 240 to 242 output optical signals having the same wavelengths as those of the received optical signals and modulated according to upstream data signals. The signals from the loop-back light sources 240 to 242 are WDM-multiplexed in the WDM MUX/DEMUX 238 of the RN 204 and then transmitted to the CO 200. The WDM optical signal is applied to the input of the WDM DEMUX 218 via the optical dividers 224 and 226 and the optical circulator 216. It is WDM-demultiplexed in the WDM DEMUX 218 and the demultiplexed optical signals are fed to respective upstream optical data receivers 220 to 222.

The first optical power measurer measures the power level of a downstream WDM optical signal directed from the multi-frequency light source 214 to the WDM MUX/DEMUX 238. The optical divider 224 in the first optical power measurer branches off a section of the downstream WDM optical signal to the optical receiver 228. The optical receiver 228 applies a voltage at the power level of the received optical signal as a reference voltage to the controller 234.

The second optical power measurer measures the power level of an upstream WDM optical signal received from the loop-back light sources 240 to 242 via the WDM MUX/DEMUX 238. The optical divider 226 in the second optical power measurer branches off a section of the upstream WDM optical signal to the optical receiver 230. The optical receiver 230 applies a voltage at the power level of the received optical signal as a monitoring voltage to the electric amplifier 232. The electric amplifier 232 amplifies the monitoring voltage with an amplification gain that renders the monitoring voltage equal to the reference voltage when the WDM wavelengths of the multi-frequency light source 214 and the WDM MUX/DEMUX 238 are identical, and feeds the amplified voltage to the controller 234.

The control unit controls the WDM wavelengths of the multi-frequency light source 214 and the WDM MUX/DEMUX 238 to be nearly identical in order to minimize the difference between the power levels of the downstream and upstream optical signals measured in the first and second optical power measurers. For this purpose, the TCU 236 of the control unit is appended to the multi-frequency light source 214 and changes temperature under the control of the controller 234. A thermo-electric cooler (TEC) can be used as the TCU 236. The controller 234 controls the temperature of the multi-frequency light source 214 through the TCU 236 such that the difference between the reference voltage received from the optical receiver 228 and the monitoring voltage received from the optical receiver 230 through the electric amplifier 232 is minimized. Accordingly the optical wavelength tracking for the WDM wavelengths of the multi-frequency light source 214 and the WDM MUX/DEMUX 238 to be identical is possible. A microprocessor can be adopted as the controller 234, for control by an optical wavelength tracking algorithm.

To describe the optical wavelength tracking in more detail, the output of the multi-frequency light source 214 in the CO 200 is maintained constant. Therefore, the reference voltage detected at the optical receiver 228 that receives a section of the output of the multi-frequency light source 214 is also maintained constant. The power of the upstream WDM optical signal is maximal when the WDM wavelengths of the multi-frequency light source 214 are identical to those of the WDM MUX/DEMUX 238. The upstream WDM optical signal is an optical signal that is generated in the downstream direction in the multi-frequency light source 214 of the CO 200, WDM-demultiplexed in the RN 204, modulated in the loop-back light sources 240 to 242 in the ONUs 210 to 250, WDM-multiplexed in the RN 204, and then transmitted to the CO 200.

Meanwhile, optical links connecting the CO 200 to the ONUs 210 to 212 undergo constant loss and the power of optical signals from the loop-back light sources 240 to 242 in the ONUs 210 to 250 is proportional to that of received optical signals. Hence, the maximum power of the upstream WDM optical signal transmitted to the CO 200 is dependent on that of the downstream WDM optical signal from the multi-frequency light source 214. If the multi-frequency light source 214 and the WDM MUX/DEMUX 238 are identical in WDM wavelength, the difference between the reference voltage and the monitoring voltage is minimized. On the other hand, as the WDM wavelength difference between the multi-frequency light source 214 and the WDM MUX/DEMUX 238 gets broad, the difference between the reference voltage and the monitoring voltage also becomes large. The controller 234 monitors the voltage difference and minimizes the difference between the reference voltage and the monitoring voltage by control of the WDM wavelengths of the multi-frequency light source 214 through the TCU 236. As a result, the controller 234 enables the WDM wavelengths of the multi-frequency light source 214 to track those of the WDM MUX/DEMUX 238 varying with temperature in the RN 204 so that they are identical all the time.

The multi-frequency light source 214 may include an AWG that is used for determining its wavelength band. Such a multi-frequency light source may include an Erbium-doped lasing light source, a spectrum-division multi-frequency light source using an Erbium-doped optical fiber, or a multi-frequency light source using a semiconductor optical amplifier. Alternatively, the multi-frequency light source 214 may adopt a resonator structure including a gain medium for oscillating an optical signal, by which its wavelength band is determined.

If the wavelength band of the multi-frequency light source 214 is determined by an AWG, a TEC used as the TCU 236 is mounted to the AWG of the multi-frequency light source 214. In this case, if the controller 234 adjusts the strength and direction of a current flowing in the TEC, the AWG's temperature is controlled and thus the AWG's WDM wavelengths are changed. Hence, the controller 234 can control the WDM wavelengths of the multi-frequency light source 214. On the other hand, if the wavelength band of the multi-frequency light source 214 is determined according to the resonator structure with a gain medium, the TEC is mounted to a light source in the multi-frequency light source 214. In this case, the controller 234 can control the WDM wavelengths of the multi-frequency light source 214 by adjusting the strength and direction of a current flowing in the TEC and thus controlling the temperature of the gain medium.

As described above, the power of the upstream WDM optical signal transmitted to the CO 200 can be maximized by enabling the WDM wavelengths of the multi-frequency light source 214 in the CO 200 to track those of the WDM MUX/DEMUX 238 in the RN 204. In this process, one of the WDM wavelengths is neither confined to tracking, nor is an additional device for measuring the power level of one channel and notifying the CO 200 of the power level used in the RN 204. The optical wavelength tracking is carried out using a section of a transmitted WDM optical signal and a simple control circuit. Thus, the present invention is more cost-effective than previously known in the art.

To facilitate the control of optical wavelength tracking in the controller 234, the reference voltage can be rendered equal to the monitoring voltage when the WDM wavelengths of the multi-frequency light source 214 and the WDM MUX/DEMUX 238 are identical. One way is by setting the dividing ratios of the optical dividers 224 and 226 to the same value, the electric amplifier 232 is positioned between the controller 234 and the optical receiver 230, and the amplification gain of the electric amplifier 232 is set in the manner that makes the monitoring voltage equal to the reference voltage when the WDM wavelengths of the multi-frequency light source 214 and the WDM MUX/DEMUX 238 are identical.

Figure 3:
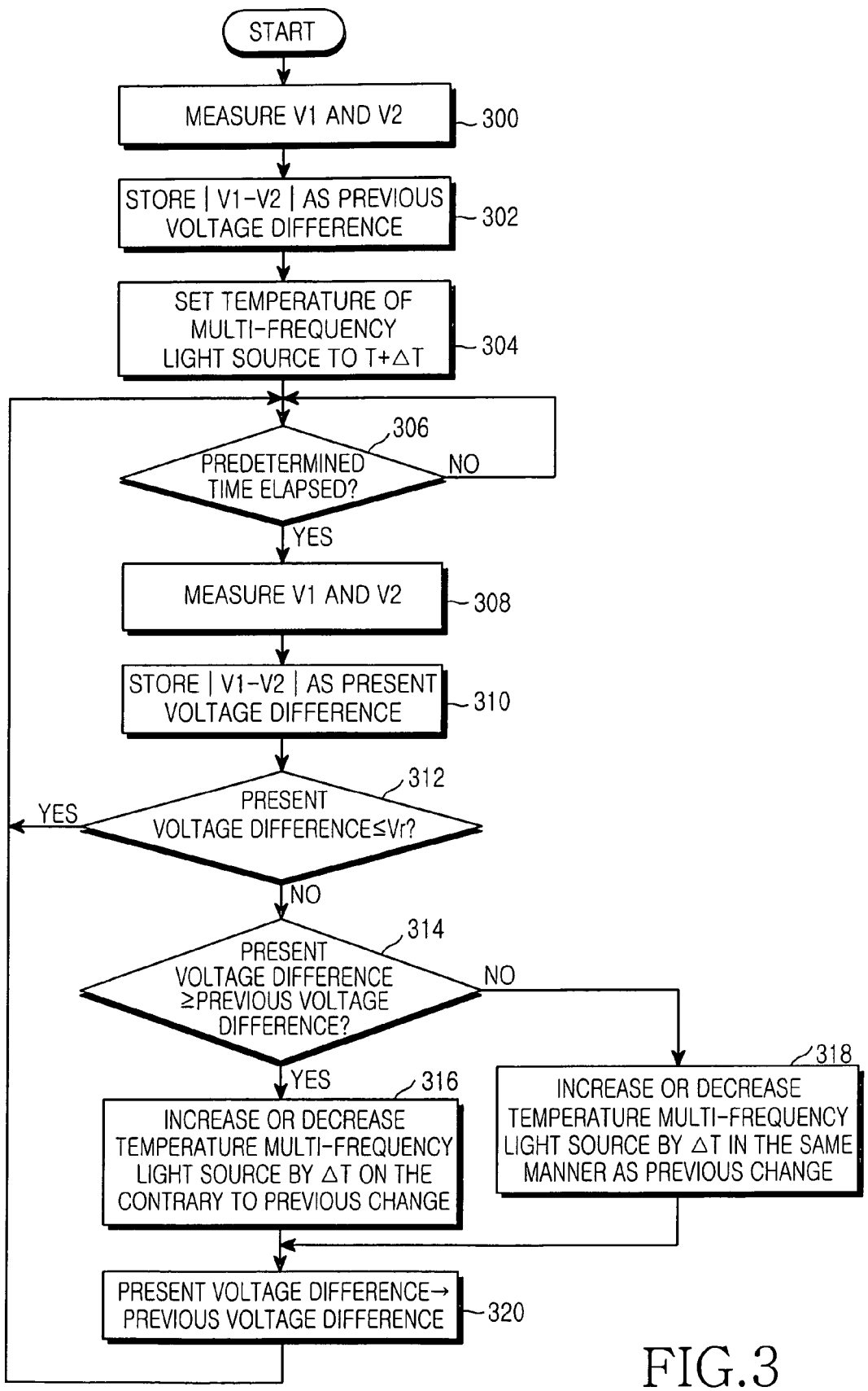
FIG. 3 is a flowchart illustrating optical wavelength tracking in a controller illustrated in FIG. 2.

An implementation of an algorithm for optical wavelength tracking by control of the temperature of the multi-frequency light source 214 in the CO in the controller 234 is shown in steps 300 to 320 of FIG. 3. As the optical wavelength tracking according to the present invention is initiated, the controller 234 measures the reference voltage and the monitoring voltage in step 300. For notational simplicity, the reference voltage is denoted by V1 and the monitoring voltage, by V2 in FIG. 3. In step 302, the controller 234 stores the absolute difference between V1 and V2, |V1−V2| as the previous voltage difference. The controller 234 increases the temperature of the multi-frequency light source 214 by a predetermined temperature variation ΔT in step 304.

A predetermined time later that takes into consideration the time required for changing the temperature of the multi-frequency light source 214 in step 306, the controller 234 measures V1 and V2 again in step 308 and stores the difference between V1 and V2, |V1−V2| as the present voltage difference in step 310.

In step 312, the controller 234 compares the present voltage difference with a threshold Vr. If the voltage difference is equal to or less than Vr, the controller 234 returns to step 306, taking into consideration that the WDM wavelengths of the multi-frequency light source 214 and the WDM MUX/DEMUX 238 are identical. In this case, the temperature of the multi-frequency light source 214 is maintained unchanged. Since the amplification gain of the electric amplifier 232 is set to render the monitoring voltage equal to the reference voltage when the WDM wavelengths of the multi-frequency light source 214 and the WDM MUX/DEMUX 238 are identical, the present voltage different is 0. Even if the present voltage difference is not truly 0 because of errors, Vr is preset to a value that can make the WDM wavelengths of the multi-frequency light source 214 and the WDM MUX/DEMUX 238 almost identical to each other.

If the present voltage difference exceeds Vr in step 312, the controller 234 compares the present voltage difference with the previous voltage difference in step 314. If the present voltage difference is equal to or greater than the voltage difference, this difference implies that the WDM wavelengths of the multi-frequency light source 214 are more discrepant from those of the WDM MIUX/DEMUX 238. Therefore, the controller 234 increases or decreases the temperature of the multi-frequency light source 214 by ΔT, by a value that is contrary to the present temperature change, in step 316. That is, if the temperature of the multi-frequency light source 214 was increased by ΔT, it is decreased by ΔT at this time, and vice versa.

On the other hand, if the present voltage difference is less than the previous voltage difference, this difference implies that the WDM wavelengths of the multi-frequency light source 214 are not significantly different from those of the WDM MUX/DEMiUX 238. Therefore, the controller 234 increases or decreases the temperature of the multi-frequency light source 214 by ΔT, in the same manner as the previous temperature change, in step 318. That is, if the temperature of the multi-frequency light source 214 was increased by ΔT, it is also increased by ΔT at this time. If the temperature of the multi-frequency light source 214 was decreased by ΔT, it is also decreased by ΔT at this time.

After step 316 or 318, the controller 234 stores the present voltage difference as the previous voltage difference in step 320 and returns to step 306.

As described above, the controller 234 periodically measures |V1−V2|. According to |V1−V2|, it maintains the temperature of the multi-frequency light source 214 unchanged, or gradually increases/decreases the temperature of the multi-frequency light source 214 by ΔT so as to minimize |V1−V2|. Thus, the WDM wavelengths of the multi-frequency light source 214 become identical to those of the WDM MUX/DEMUX 238.

If the controller 234 dynamically sets ΔT according to |V1−V2| in such a manner that ΔT is set large as |V1−V2| is relatively large and small as |V1−V2| is relatively small, the optical wavelength tracking is done in a shorter time.

Meanwhile, along with the temperature change of the RN 204, the WDM wavelengths of the WDM DEMUX 218 in the CO 200 become varied from those of the WDM MUX/DEMUX 238 in the RN 204. Therefore, the WDM wavelengths of the WDM DEMUX 218 as well as those of the multi-frequency light source 214 in the CO 200 can be enabled to track those of the WDM MUX/DEMUX 238 in the RN 204.

Figure 4:
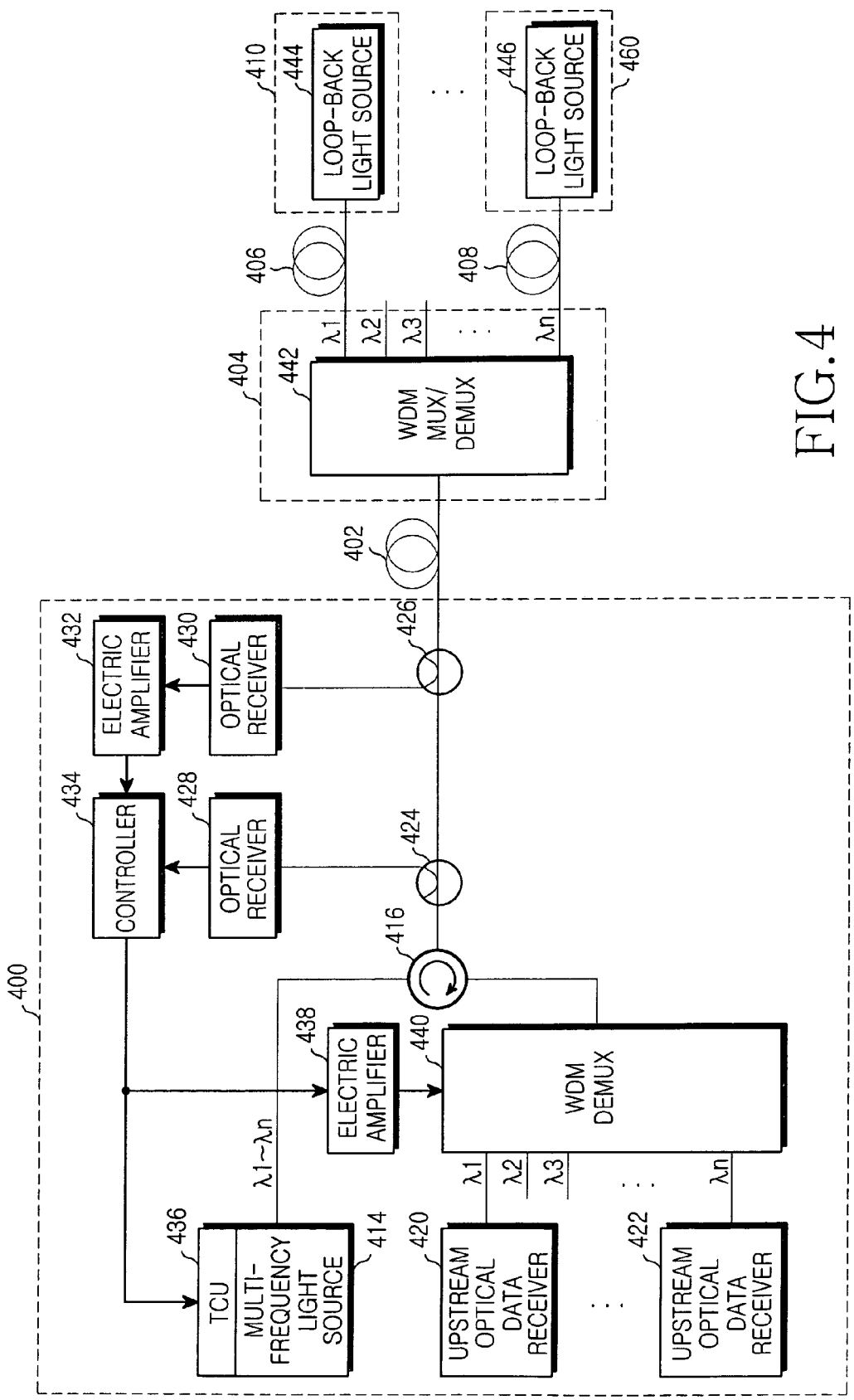
FIG. 4 illustrates the configuration of a WDM PON using loop-back light sources, including an optical wavelength tracking apparatus according to another aspect of the present invention.

FIG. 4 illustrates the configuration of a WDM PON using loop-back light sources according to another aspect of the present invention, which allows the WDM wavelengths of a WDM DEMUX 418 as well as those of a multi-frequency light source 414 in a CO 400 to track those of a WDM MUX/DEMUX 442 in an RN 404. Another embodiment of the optical wavelength tracking apparatus for the CO 400 according to the present invention is also comprised of first and second optical power measurers and a control unit. As in the optical wavelength tracking apparatus illustrated in FIG. 2, the first power measurer includes an optical divider 424 and an optical receiver 428, and the second optical power measurer includes an optical divider 426, an optical receiver 430, and an electric amplifier 432. Notably, the control unit further has an electric amplifier 438 and a TCU 440 in addition to a controller 434 and a TCU 436.

As in the WDM PON illustrated in FIG. 2, the CO 400 is connected to the RN 404 adjacent to subscribers by a single optical fiber 402, and the RN 404 is connected to ONUs 410 to 460 by independent optical fibers 406 to 408. An upstream data transmission structure in which the ONUs 410 to 460 transmit data to the CO 400 via a WDM MUX/DEMUX 442 in the RN 404 is illustrated in FIG. 4. There are n ONUs 410 to 460 and thus the multi-frequency light source 414 generates a WDM optical signal containing optical signals at n wavelengths λ1 to λn.

The optical dividers 424 and 426 are disposed in the optical signal path between the optical fiber 402 connected to the WDM MUX/DEMUX 442 of the RN 404 and an optical circulator 416.

The control unit controls the WDM wavelengths of the multi-frequency light source 414 and the WDM DEMUX 418 so as to be nearly identical to those of the WDM MUX/DEMUX 442 in order to minimize the difference between the power levels of the downstream and upstream optical signals measured in the first and second optical power measurers. For this purpose, the TCU 436 of the control unit is appended to the multi-frequency light source 414 and changes its temperature under the control of the controller 434, and the other TCU 440 is mounted to the WDM DEMUX 418 and changes its temperature through the electric amplifier 438 under the control of the controller 434. A TEC can also be used as the TCU 440. If the WDM DEMUX 418 is an AWG, a TEC used as the TCU 440 is mounted to the AWG In this case, if the controller 434 adjusts the strength and direction of a current flowing in the TEC, the AWG's temperature is controlled and thus the AWG's WDM wavelengths are changed. Hence, the controller 434 can control the WDM wavelengths of the WDM DEMUX 418.

Here, the electric amplifier 438 is used for the controller 434 to control simultaneously the TCUs 436 and 438 through one output port because the multi-frequency light source 414 and the WDM DEMUX 418 exhibit different wavelength characteristics with respect to temperature. Accordingly, the amplification gain of the electric amplifier 438 is set in correspondence with the wavelength characteristics of the multi-frequency light source 414 and the WDM DEMUX 418 with respect to temperature. However, if the controller 434 is configured to control the TCUs 436 and 440 separately through different output ports, there is no need for the electric amplifier 438.

The controller 434 controls the temperature of the multi-frequency light source 414 to thereby minimize the difference between a reference voltage received from the optical receiver 428 and a monitoring voltage received from the optical receiver 430 through the electric amplifier 432. At the same time, it controls the temperature of the WDM DEMUX 418 by means of the TCU 440. Thus, optical wavelength tracking is carried out so that the WDM wavelengths of the multi-frequency light source 414 and the WDM DEMUX 418 are nearly identical to those of the WDM MUX/DEMUX 442.

Consequently, the WDM wavelengths of the WDM DEMUX 418, which demultiplexes an upstream WDM optical signal and provides the demultiplexed signals to optical receivers 420 to 422, as well as those of the multi-frequency light source 414, also tracks output of the WDM MUX/DEMUX 442.

The power of the upstream WDM optical signal transmitted to the CO 400 is, therefore, maximized and degradation from adjacent channels is minimized in the upstream WDM optical signal WDM-demultiplexed in the WDM DEMUX 418. In this process, none of the WDM wavelengths are confined to tracking, or are any additional devices required for measuring the power level of one channel and notifying the CO 400 of the power level used in the RN 404. The optical wavelength tracking is carried out using a section of a transmitted WDM optical signal and a simple control circuit. Thus, the present invention is more cost-effective than known heretofore in the art.

In accordance with the present invention as described above, optical wavelength tracking is carried out so efficiently, economically that the WDM wavelengths of a multi-frequency light source and/or a WDM DEMUX in a CO can track those of a WDM MUX/DEMUX in an RN.

While the invention has been shown and described with reference to certain preferred embodiments thereof, they are mere exemplary applications. For example, while an AWG is used as the WDM MUX/DEMUX 442, the same thing occurs when a device having a wavelength variable with temperature is adopted as the WDM MUX/DEMUX 442. Thus, it will be understood by those skilled in the art that various changes in form and details may be made therein without departing from the spirit and scope of the invention as defined by the appended claims.

What is claimed is:

1. An optical wavelength tracking apparatus in a wavelength division multiplexed (WDM) passive optical network (PON) in which a central office (CO) having a multi-frequency light source is connected to a plurality of optical network units (ONUs) having loop-back light sources through a WDM multiplexer/demultiplexer (MUX/DEMUX) in a remote node (RN), the apparatus comprising:

a first optical power measurer for measuring a power level of a downstream WDM optical signal for the plurality of ONUs that is directed from the multi-frequency light source to the WDM MUX/DEMUX;

a second optical power measurer for measuring a power level of an upstream WDM optical signal received from the loop-back light sources of the ONUs through the WDM MUX/DEMUX; and a control unit for controlling the WDM wavelengths of the multi-frequency light source and the WDM MUX/DEMUX to be nearly identical in order to minimize the difference between the power levels of the measured downstream and upstream WDM optical signals.

2. The optical wavelength tracking apparatus of claim 1, wherein the WDM MUX/DEMUX comprises an arrayed waveguide grating (AWG).

3. The optical wavelength tracking apparatus of claim 1, wherein the control unit controls the WDM wavelengths of a WDM DEMUX in the CO, for WDM-demultiplexing the upstream WDM optical signal to the WDM wavelengths of the WDM MUX/DEMUX.

4. The optical wavelength tracking apparatus of claim 3, wherein the WDM DEMUX comprises an arrayed waveguide grating (AWG).

5. An optical wavelength tracking apparatus in a wavelength division multiplexed (WDM) passive optical network (PON) in which a central office (CO) having a multi-frequency light source is connected to a plurality of optical network units (ONUs) having loop-back light sources through a WDM multiplexer/demultiplexer (MUX/DEMUX) in a remote node (RN), the apparatus comprising:

a first optical divider for branching off a section of a downstream WDM optical signal for the ONUs directed from the multi-frequency light source to the WDM MUX/DEMUX;

a first optical receiver for receiving the branched optical signal from the first optical divider and outputting a voltage at the power level of the received optical signal as a reference voltage;

a second optical divider for branching off a section of an upstream WDM optical signal received from the loop-back light sources through the WDM MUX/DEMUX;

a second optical receiver for receiving the branched optical signal from the second optical divider and outputting a voltage at the power level of the received optical signal as a monitoring voltage;

a temperature control unit (TCU) mounted to the multi-frequency light source; and a controller for controlling the WDM wavelengths of the multi-frequency light source and the WDM MUX/DEMUX to be nearly identical by adjusting the temperature of the multi-frequency light source by means of the TCU in order to minimize the difference between the reference voltage and the monitoring voltage.

6. The optical wavelength tracking apparatus of claim 5, wherein the WDM MUX/DEMUX comprises an arrayed waveguide grating (AWG).

7. The optical wavelength tracking apparatus of claim 5, further comprising an electric amplifier for amplifying the monitoring voltage applied from the second optical receiver to the controller with an amplification gain set to make the monitoring voltage equal to the reference voltage when the WDM wavelengths of the multi-frequency light source and the WDM MUX/DEMUX are nearly identical, wherein the dividing ratios of the first and second optical dividers are equal.

8. The optical wavelength tracking apparatus of claim 5, further comprising a TCU mounted to a WDM DEMUX in the CO, for WDM-demultiplexing the upstream WDM optical signal, wherein the controller adjusts the WDM wavelengths of the WDM DEMUX to be nearly identical to the WDM wavelengths of the WDM MUX/DEMUX by adjusting the temperature of the WDM DEMUX in correspondence with the temperature control of the multi-frequency light source through the TCU mounted to the WDM DEMUX.

9. The optical wavelength tracking apparatus of claim 8, wherein the WDM DEMUX comprises an arrayed waveguide grating (AWG).

10. The optical wavelength tracking apparatus of claim 8, further comprising an electric amplifier connected between the controller and the TCU mounted to the WDM DEMUX, said electric amplifier having an amplification gain set in correspondence with the difference between the wavelength characteristics of the multi-frequency light source and the WDM DEMUX with respect to temperature.

11. An optical wavelength tracking method in a wavelength division multiplexed (WDM) passive optical network (PON) in which a central office (CO) having a multi-frequency light source is connected to a plurality of optical network units (ONUs) having loop-back light sources through a WDM multiplexer/demultiplexer (MUX/DEMUX) in a remote node (RN), the method comprising the steps of:

(a) branching off a section of a downstream WDM optical signal for the ONUs directed from the multi-frequency light source to the WDM MUX/DEMUX, (b) measuring the power level of the branched optical signal as a reference voltage, (c) branching off a section of an upstream WDM optical signal received from the loop-back light sources through the WDM MUX/DEMUX, (d) measuring the power level of the branched optical signal as a monitoring voltage; and (e) controlling the WDM wavelengths of the multi-frequency light source and the WDM MUX/DEMUX to be nearly identical by adjusting the temperature of the multi-frequency light source in order to minimize the difference between the reference voltage and the monitoring voltage.

12. The optical wavelength tracking method of claim 11, wherein the step (e) of making the WDM wavelengths nearly identical comprises the sub-steps of:

(i) periodically measuring a present difference between the reference voltage and the monitoring voltage;

(ii) maintaining the temperature of the multi-frequency light source if the present voltage difference is equal to or less than a predetermined threshold;

(iii) comparing the present voltage difference between a previous voltage difference if the present voltage difference is greater than the threshold;

(iv) increasing or decreasing the temperature of the multi-frequency light source by a predetermined value in the same manner as a previous temperature change if the previous voltage difference is greater than the present voltage difference; and (v) increasing or decreasing the temperature of the multi-frequency light source by the predetermined value on the contrary to the previous temperature change if the previous voltage difference is equal to or less than the present voltage difference.

13. The optical wavelength tracking method of claim 12, further comprising the step of setting the value larger if the present voltage difference is relatively large, and smaller if the present voltage difference is relatively small.

14. An optical wavelength tracking method in a wavelength division multiplexed (WDM) passive optical network (PON) in which a central office (CO) having a multi-frequency light source connected to a plurality of optical network units (ONUs) having loop-back light sources through a WDM multiplexer/demultiplexer (MUX/DEMUX) in a remote node (RN), the method comprising the steps of:
 (a) branching off a section of a downstream WDM optical signal for the ONUs directed from the multi-frequency light source to the WDM MUX/DEMUX,
 (b) measuring the power level of the branched optical signal as a reference voltage,
 (c) branching off a section of an upstream WDM optical signal received from the loop-back light sources through the WDM MUX/DEMUX, and measuring the power level of the branched optical signal as a monitoring voltage; and
 (d) controlling the WDM wavelengths of the multi-frequency light source and the WDM MUX/DEMUX to be nearly identical by adjusting the temperature of the multi-frequency light source in order to minimize the difference between the reference voltage and the monitoring voltage.

15. The optical wavelength tracking method of claim 14, wherein the step (d) of making the WDM wavelengths nearly identical comprises the sub-steps of:
 (i) periodically measuring a present difference between the reference voltage and the monitoring voltage;
 (ii) maintaining the temperature of the multi-frequency light source if the present voltage difference is equal to or less than a predetermined threshold;
 (iii) comparing the present voltage difference between a previous voltage difference if the present voltage difference is greater than the threshold;
 (iv) increasing or decreasing the temperature of the multi-frequency light source by a predetermined value in the same manner as a previous temperature change if the previous voltage difference is greater than the present voltage difference; and
 (v) increasing or decreasing the temperature of the multi-frequency light source by the predetermined value on the contrary to the previous temperature change if the previous voltage difference is equal to or less than the present voltage difference.

16. The optical wavelength tracking method of claim 15, further comprising the step of setting the value larger if the present voltage difference is relatively large and smaller if the present voltage difference is relatively small.

* * * * *